Figure 1:
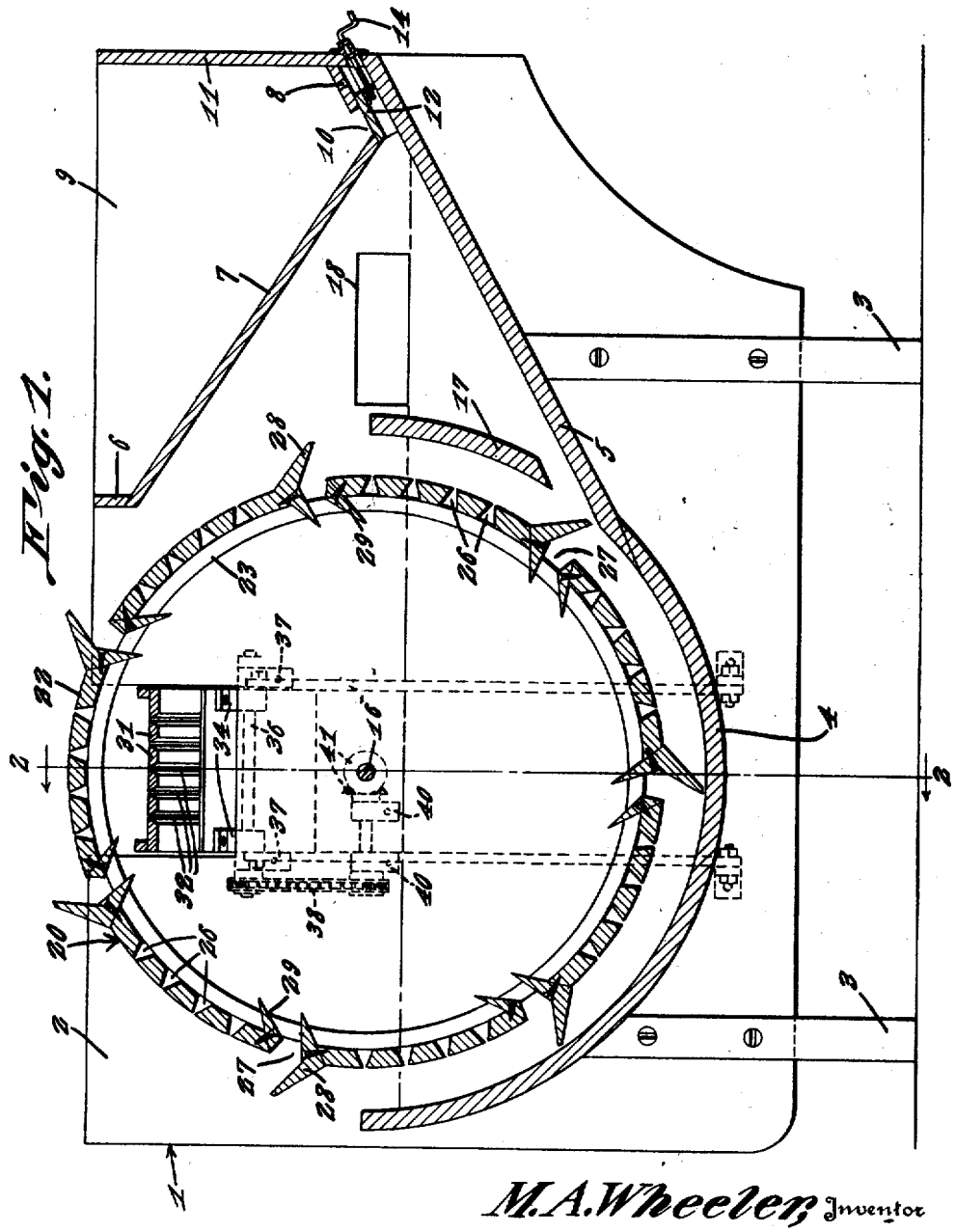

Jan. 1, 1924. 1,479,764
M. A. WHEELER
MACHINE FOR TREATING SMALL GRAIN
Filed May 3, 1922 2 Sheets-Sheet 1

M. A. Wheeler, Inventor

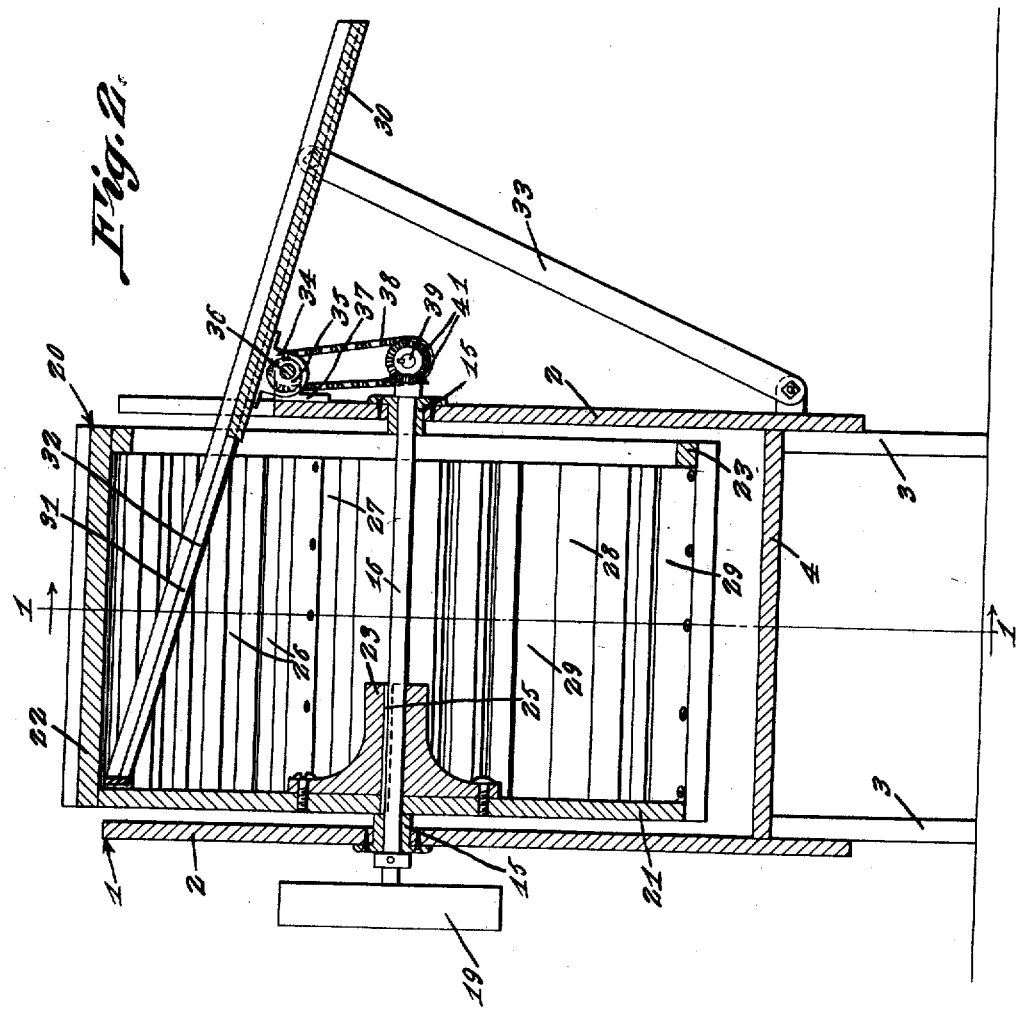

Patented Jan. 1, 1924.

1,479,764

UNITED STATES PATENT OFFICE.

MAX A. WHEELER, OF LIND, WASHINGTON.

MACHINE FOR TREATING SMALL GRAIN.

Application filed May 3, 1922. Serial No. 558,096.

*To all whom it may concern:*

Be it known that I, MAX A. WHEELER, a citizen of the United States, residing at Lind, in the county of Adams and State of Washington, have invented a new and useful Machine for Treating Small Grain, of which the following is a specification.

This invention aims to provide a simple but effective machine whereby grain may be treated for the prevention of smut, the device being so constructed that much labor will be saved in the handling of the grain, the grain being subjected repeatedly to the action of the treating liquid, and novel means being provided for carrying the treated grain out of the machine.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in longitudinal section, a device constructed in accordance with the invention; Figure 2 is a section on the line 2—2 of Figure 1, the line 1—1 in Figure 2 indicating the cutting plane on which Figure 1 is taken.

In carrying out the invention there is provided a frame including a tank 1 comprising side walls 2, the tank being supported on legs 3. A trough-shaped bottom 4 extends between the side walls 2. A runway 5 and cross members 6, 7 and 8 extend between the side walls 2, the parts 6, 7 and 8 defining a hopper 9 discharging on the upper end of the run-way 5, the run-way 5 slanting downwardly and communicating with the bottom 4. An end wall 1 extends between the side walls 2 as does a guard 17. There is an opening 18 in one of the side walls 2, between the guard 17 and the member 7 which forms the bottom of the hopper 9. There is an opening 10 between the member 8 of the hopper and the end wall 11.

The opening 10 is controlled by a gate 12 operated by an adjusting device 14.

Bearings 15 are mounted on the side walls 2 of the tank 1. A main shaft 16 is journaled for rotation in the bearings 15 and may be driven in any desired way, for instance by a pulley 19.

A drum 20 is located in the tank 1. The drum may be constructed in various ways without departing from the spirit of the invention, but, preferably, the drum embodies an end wall 21 carrying a shell 22, a supporting ring 23 being mounted within the shell 22 at the opposite end of the drum from the wall 21. A hub 23 projects inwardly from the wall 21 of the drum 20 and is keyed at 25 to the shaft 16. Flared openings 26 are formed in the shell 22 of the drum 20. The shell 22 of the drum 20 is provided with other openings 27 which are larger than the openings 26. First wings 28 are secured to the shell 22 and extend along one edge of the openings 26. The wings 28 comprise outwardly extended parts, and inwardly extended parts, disposed at an angle to each other. Second wings 29 are secured to the shell 22 of the drum 20, at the opposite side of the openings 26 from the wings 28, the wings 29 projecting inwardly into the drum.

The numeral 30 marks a chute disposed parallel to the shaft 16 and provided at its inner end with slats 31 or constructed otherwise, so that openings 32 exist in the upper end of the chute. The inner end of the chute 30 projects within the drum 20. Supports 33 are provided. The upper ends of the supports 33 are pivoted to the chute 30 and the lower ends of the supports are pivoted to one of the side walls 2 or to some other accessible portion of the frame. Intermediate its end, the chute 30 is supplied with straps 34 wherein eccentrics 35 operate, the eccentrics being mounted on an auxiliary shaft 36 disposed at right angles to the shaft 16. The auxiliary shaft 36 is journaled in bearings 37 on one of the side walls 2 and is connected operatively by a sprocket chain 38 with a third shaft 39, disposed parallel to the auxiliary shaft 36 and located therebelow, the third shaft 39 being journaled in bearings 40 on one of the side walls 2, beveled pinions 41, or any other suitable means, forming an operative connection between the shaft 39 and the shaft 16.

In practical operation, the treating liquid is placed in the tank 1 at any desired level for instance to the level indicated by the dash line in Figure 1. The grain which is to be treated is deposited in the hopper 9. The gate 12 is operated by the adjusting device 14, and the grain flows from the hopper 9 through the opening 10 on the inclined runway 5, the grain passing from thence upon the trough-shaped bottom 4 of the tank.

When rotation is imparted to the shaft 16, the drum 20 will be rotated. When the drum 20 is rotated, the outer portions of the wings 28 scoop up the grain from the bottom 4 of the tank and carry the grain upwardly. When the wings 28 have arrived at a point adjacent to the top of the structure, the grain runs inwardly, and, traversing the inner portions of the wings 28, drops to the bottom of the drum 20 within the drum. Here, the grain is taken by the inwardly projecting wings 29 and is carried upwardly, the grain being deposited in the inner end of the chute 30. The liquid drains out of the grain, on the chute 30, between the slats 31. The grain, having been treated, flows downwardly off the chute 30.

When the shaft 16 is rotated, rotation is imparted to the shaft 39 through the instrumentality of the beveled pinions 41, the sprocket chain 38 driving the shaft 36, the eccentrics 35 being rotated, and the straps 34 imparting a shaking movement to the chute 30.

The grain is passed through the liquid along the bottom 4, by the outer portions of the wings 28. The grain having been elevated, falls within the drum 20 and enters the liquid again. Finally, the grain is elevated out of the liquid, by the wings 29. In view of the foregoing, it will be obvious that a full treatment of the grain results.

What is claimed is:—

In a device of the class described, a tank, a drum journaled in the tank and provided with openings, a chute extended into the end of the drum and located adjacent to the top of the drum, angular wings carried by the drum and extended along one edge of each opening, the wings comprising inner and outer parts forming a pocket, the outer part serving to scoop material from the bottom of the tank and to deposit the material in the pocket, the inner part being so located as to permit a spilling of the material from the pocket into the drum before the wing arrives at a position directly above the chute, and wings carried by the drum and extended along the other edge of each opening, the last specified wings being so located as to prevent material from passing out of the drum into the tank, through the openings, after the material has been spilled into the tank, and being so located as to carry the material upwardly and deposit the same in the chute.

In testimony that I claim the foregoing as my own, I have hereto affixed my signature in the presence of two witnesses.

MAX A. WHEELER.

Witnesses:
 WILLIAM KASPER,
 JACOB KREHBIEL.